(12) United States Patent
Upadhye et al.

(10) Patent No.: US 7,287,386 B2
(45) Date of Patent: *Oct. 30, 2007

(54) CONTAINER COOLER AND WARMER

(75) Inventors: Shashank S. Upadhye, Naperville, IL (US); Shilpa M. Upadhye, Naperville, IL (US); Adam S. Thomas, Oak Park, IL (US); James A. Weir, Palatine, IL (US)

(73) Assignee: Snuddles, LLC, West Windsor, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/827,663

(22) Filed: Apr. 19, 2004

(65) Prior Publication Data

US 2004/0194470 A1 Oct. 7, 2004

Related U.S. Application Data (63) Continuation of application No. PCT/US02/33666, filed on Oct. 22, 2002.

(51) Int. Cl.
*F25B 21/02* (2006.01)
(52) U.S. Cl. ............................................. 62/3.3; 62/62
(58) Field of Classification Search ............ 62/3.3–3.7, 62/62, 457.9, 371, 457.4, 3.64; 219/501; 165/80.5
See application file for complete search history.

(56) References Cited

U.S. PATENT DOCUMENTS

| | | | |
|---|---|---|---|
| 1,762,171 A | 6/1930 | Goldsmith |
| 2,170,287 A | 8/1939 | Kinnebrew |
| 2,394,618 A | 2/1946 | Kunasch |
| 2,456,548 A | 12/1948 | Weiner |
| 2,490,580 A | 12/1949 | Colla |
| 2,696,594 A | 12/1954 | Harrington |
| 2,756,031 A | 7/1956 | Sanstrom |
| 2,834,566 A | 5/1958 | Bower |
| 2,992,316 A | 7/1961 | Baumstein |
| 3,363,214 A | 1/1968 | Wright |
| 3,402,763 A | 9/1968 | Peterson |
| 3,611,274 A | 10/1971 | Low |
| 3,658,122 A | 4/1972 | Kalyk |
| 3,737,835 A | 6/1973 | Clement |
| 3,804,076 A | 4/1974 | Fant |
| 3,808,577 A | 4/1974 | Mathauser |
| 3,892,945 A | 7/1975 | Lerner |
| 4,045,105 A | 8/1977 | Lee |
| 4,163,471 A | 8/1979 | Leder |
| 4,187,412 A | 2/1980 | Enster |

(Continued)

FOREIGN PATENT DOCUMENTS

GB 2234057 1/1991

(Continued)

*Primary Examiner*—Mohammad M. Ali
(74) *Attorney, Agent, or Firm*—Shashank Upadhye (57) ABSTRACT

Disclosed is a container warmer that utilizes the same compartment for heating and cooling. In optional embodiments, the unit may include a programmable timer operably connected to the heating and cooling units such that the timer may regulate activity of the units. In other embodiments, the invention may include a baby bottle warmer in which the baby bottle is placed in a water bath in a compartment, the water bath being heated or cooled by heating or cooling units, and optionally operably connected to a programmable timer.

38 Claims, 2 Drawing Sheets

U.S. PATENT DOCUMENTS

| | | |
|---|---|---|
| 4,215,785 A | 8/1980 | Schwaiger |
| 4,274,262 A | 6/1981 | Reed |
| 4,455,842 A | 6/1984 | Granlund |
| 4,535,604 A | 8/1985 | Cavalli |
| 4,538,427 A | 9/1985 | Cavalli |
| 4,573,329 A | 3/1986 | Cavalli |
| 4,597,435 A | 7/1986 | Fosco |
| 4,681,458 A | 7/1987 | Cavalli |
| 4,681,611 A * | 7/1987 | Bohner ............... 62/3.64 |
| 4,782,670 A * | 11/1988 | Long et al. ............ 62/457.4 |
| 4,827,731 A | 5/1989 | Ikeda |
| 4,827,732 A | 5/1989 | Suyama |
| 4,874,316 A | 10/1989 | Kamon |
| 4,880,535 A | 11/1989 | Burrows |
| 4,903,506 A | 2/1990 | Delisle |
| 4,913,318 A | 4/1990 | Forrester |
| 4,914,920 A | 4/1990 | Carnagie |
| 4,920,763 A | 5/1990 | Provest |
| 5,060,479 A | 10/1991 | Carmi |
| 5,209,069 A | 5/1993 | Newman |
| 5,315,084 A | 5/1994 | Jensen |
| 5,363,746 A | 11/1994 | Gordon |
| 5,397,031 A | 3/1995 | Jensen |
| 5,399,102 A | 3/1995 | Devine |
| 5,462,452 A | 10/1995 | Devine |
| 5,480,313 A | 1/1996 | D'Alayer de Costemore |
| 5,502,981 A | 4/1996 | Sullivan |
| 5,572,872 A | 11/1996 | Hlavacek |
| 5,718,124 A | 2/1998 | Senecal |
| 5,720,171 A | 2/1998 | Osterhoff |
| 5,771,709 A | 6/1998 | Smith |
| 5,797,313 A | 8/1998 | Rothley |
| 5,927,524 A | 7/1999 | Miller |
| 5,941,729 A | 8/1999 | Sri Jayantha |
| 5,975,337 A | 11/1999 | Hadley |
| 6,064,044 A | 5/2000 | Jerome |
| 6,082,114 A | 7/2000 | Leonoff |
| 6,234,165 B1 | 5/2001 | Creighton |
| 6,279,470 B2 | 8/2001 | Simeray |

FOREIGN PATENT DOCUMENTS

| | | |
|---|---|---|
| GB | 2236386 | 4/1991 |
| GB | 2344523 | 6/2000 |

* cited by examiner

CONTAINER COOLER AND WARMER

CROSS REFERENCE OF RELATED APPLICATIONS

This application is a continuation application of, and claims priority to, PCT application Ser. No.: PCT/US02/33666 (filed 22 Oct. 2002), which itself claims priority to, and the benefits of the earlier filing dates of, U.S. patent application Ser. No. 10/004,130 (filed 23 Oct. 2001), which is now U.S. Pat. No. 6,571,564 (issued 03 Jun. 2003), the disclosures of which are expressly incorporated by reference herein.

TECHNICAL FIELD OF THE INVENTION

The invention relates to a container cooler and warmer.

BACKGROUND OF THE INVENTION

Without a doubt, a newborn and infant will feed at its own schedule. This child cries until it is fed. The problem is that often, a parent is required to go downstairs (or elsewhere) and remove pre-prepared milk from the cooler (e.g., refrigerator) or prepare it from scratch, heat it, and then come upstairs, all while the child cries. Most parents recognize that the time spent making up the bottle is agonizing for the parent and the child. Any invention that minimizes the time interval between the child awakening and being fed would be greatly received. The first problem, therefore, is simply the need to avoid making trips to other rooms at night.

In addition, given the increasing cost of formula or the difficulty in obtaining breast milk by mothers who pump, it is desirable to save as much unused milk as possible. At the end of the feeding, any unused milk must be returned to the refrigerator otherwise it will spoil. The second problem, therefore, is to save formula or precious breast milk to avoid the need to later pump additional milk to compensate for that lost milk. The time saved by not having to pump is significant and also reduces the pain associated with pumping.

Most parents understand that the child will awake during the night many times. It is no wonder that many jokes are made about midnight or three a.m. feedings. This recognizes an important, but surprisingly overlooked characteristic; namely that children tend to be on a schedule. Accordingly, rather than trying to fight the nighttime feeding, the parent can work with the child's schedule. This is especially important if there is a primary care giver and the primary breadwinner in the same room, such that prolonged crying disrupts the breadwinner. The third problem, therefore, is not having a bottle ready even though a parent will precisely know when the baby will awake and cry for milk.

In addition, the fourth problem involves traveling. Traveling poses unique problems for the parents and the children. In automobile travel, it is nearly impossible to adequately transport milk because of cooling and then subsequent heating problems. Similarly, in overnight lodgings, often times the lodgings are not equipped with ovens, microwave ovens, refrigerators, etc. and accordingly portable devices that can substitute for cooling and heating units would be well received. In this regard, the unit can come equipped for car lighter adapters to provide electronic cooling/heating during long travels. Hotels can benefit from additional revenue, not by increasing the room rate, but by renting out the unit to guests in the same manner that extra cots, media games, or high-tech accessories are available for rent.

Partial solutions exist to some of the above-identified problems. But they fail in most respects. Some devices include flash warmers that heat a bottle quickly. Flash warmers, however, require removal of the bottle from the refrigerator. This definitely means a midnight trip to the refrigerator. Accordingly, even though flash warmers may reduce the time spent warming the bottle versus using a traditional stovetop method or the more dangerous microwave oven method, it still does not solve a problem associated with cooling a bottle or having a cooled bottle immediately on hand. Most importantly, though, the flash warmer cannot be adapted to have a bottle ready for when the child awakes. And yet another problem with flash warmers is that there is no way to transport it in the car for long trips. The travel requirement relegates the parent to carrying separate bottle bags, usually with freezable gel packs.

One of the problems with flash warmers is that there is no way to keep the bottle cool during the night. Trips to the refrigerator are standard procedures. Given the child's generally consistent sleep schedule, flash warmers are no use even if the child is scheduled. This is because flash warmers cannot turn on or off as a function of time. Flash warmers simply turn on when manually activated by the parent. A bottle cannot be set into the warmer overnight because the milk is left unrefrigerated and it will spoil. Accordingly, flash warmers have no timers to provide for automated warming or cooling.

Other devices discuss having separate warming and cooling compartments. For those units that purportedly are day-night warmers (also known as dusk to dawn units), these warmers are not timed and nor are they self-contained units. Human intervention is still required to manually move the bottle from the cooling portion to the heat portion. In use, these units generally require the following steps: freeze the gel pack ahead of time, prepare milk in the bottle, insert the bottle into the cold compartment alongside the frozen gel pack, remove the bottle when child awakens, insert the bottle into the warming compartment, manually activate the warmer, and finally remove bottle when warm.

As the frozen gel pack thaws during the night, it becomes incapable of maintaining a cold enough temperature to safely store unused milk as that milk will be hot when it is returned to the cold compartment and that hot milk must return to safe temperatures. Again, another trip the refrigerator may be necessary in the night to return unused milk. Accordingly, whilst the parent may save a trip to the refrigerator at the beginning of the feeding cycle, another trip will likely be required at the end of the cycle. Plainly, the dusk to dawn warmers fail to solve most of the problems associated with nighttime feedings. In addition, the cooling unit is simply a freezeable gel pack that must be removed each morning, frozen, and replaced into the unit each night. Therefore, if the parent forgets to remove it in the morning, no gel pack is available for that night and the unit is useless for that night. None of these units can be timer activated because the heating and cooling compartments are separate.

The other problem with flash warmers or other dusk to dawn warmers/coolers is that there is no uniform heating/cooling or temperature modulation to maintain constancy. Thus it is hard to maintain thermoequilibrium.

SUMMARY OF THE INVENTION

The foregoing problems are solved and a technical advance is achieved by the present invention. Disclosed is a container cooler and/or warmer that utilizes the same compartment for heating and cooling. In optional embodiments, the unit may include a programmable timer.

DETAILED DESCRIPTION OF THE INVENTION

Figure 1:
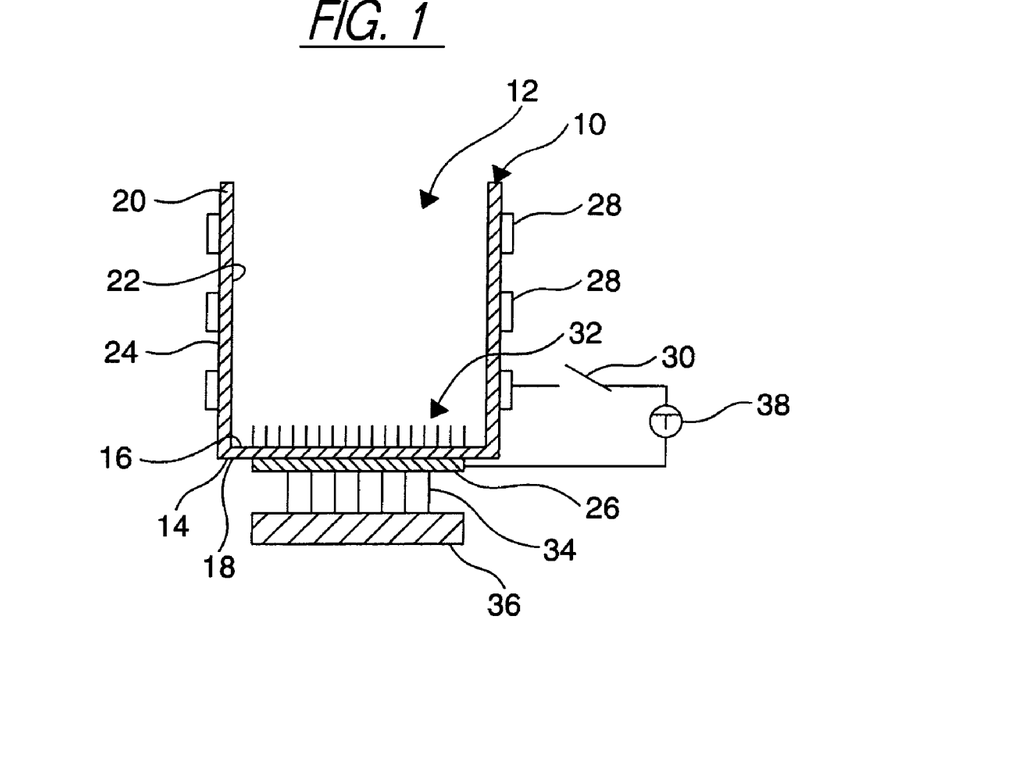
FIG. 1 is an embodiment of the invention.

FIG. 1 shows an embodiment of the invention. Shown is an inner container housing 10 having an internal space 12, an inner container housing bottom 14, an inner container housing bottom inner surface 16, and an inner container housing bottom external surface 18. The inner container housing 14 has at least one side wall 20. In some embodiments the at least one side wall 20 may be a plurality of side walls manufactured to be liquid tight. In other embodiments, the at least one side wall 20 may be uniformly constructed, thereby reducing the need to seal various side walls together. The shape of the inner container housing may be cylindrical. The at least one side wall 20 has a side wall inner surface 22 and a side wall external surface 24. The side wall inner surface 22 generally faces the internal space 12. The side wall inner surface 22 may be smooth, rough, invaginated, grooved, polished, insulated, or coated. Grooves, invaginations or other similar structures may be used to increase the surface area of the side wall inner surface. Coatings or polishes may be used to increase thermoconductivity, provide aesthetically pleasing design, or protect the side wall from build-up, rust, or the like. Fluid graduation markings may also be placed on the side wall inner surface 22. Similarly, the side wall external surface 24 may be smooth, rough, invaginated, grooved, polished, insulated, or coated. Preferably, the side wall 20 and/or the inner container housing bottom 14 comprises a thermoconductive non-pliable material, such as aluminum. The side wall 20 and/or the inner container housing bottom 14 may also be of varying thicknesses. The inner container housing bottom 14 may also be a separate piece than the at least one side wall 20 such that the inner container housing bottom 14 is attached to the side wall 20. Or the inner container housing bottom 14 and the at least one side wall can be integrally formed from as one piece. The integral formation may reduce the need to seal the junction of the bottom 14 to the side wall 20 to create a liquid tight inner space 12. The inner container housing 10 may be adapted to at least partially enclose the container, such as a baby bottle.

Disposed adjacent to the inner container housing 10 may be at least one first thermoregulation member 26. This first thermoregulation member 26 may comprise at least one of a water bath, recirculating water bath, evaporator, heat transfer fluid unit, plurality of fins, at least one fan, thermoelectric module, Stirling Cycle unit, absorption unit, refrigerant unit, thermoacoustic unit, and heat sink, or combination thereof.

In addition, disposed adjacent to the inner container housing 10 may be at least one second thermoregulation member 28, which may comprise at least one of a heater coil, radiant heat module, convection heat module, heater band, flexible heater band, thermoelectric module, and conduction heat module, or combination thereof. A switch 30 may be operably connected to the first and second thermoregulation members.

As shown as one embodiment in FIG. 1, the first thermoregulation member 26 may comprise a thermoelectric module. Thermoelectric module technology is well known and briefly comprises of two plates sandwiching doped semiconductor material. When the current flows in one direction through the module, one plate will become the "hot" side or "hot" plate and the other plate will become the "cold" side. An inner container housing bottom heat sink 32, a first thermoregulation member heat sink 34, and a fan 36 may all, individually, or in combination, be used in conjunction with the thermoelectric module to optimize performance. In one embodiment, the thermoelectric module may have its "cold" side adjacent to the inner container housing bottom external surface 18, thereby drawing heat from the surface and causing the inner space 12 to become colder. To further optimize performance, the heat sink 32 may be integrally formed with the inner container housing 10, the inner container housing bottom 14, or the inner container housing bottom inner surface 16, or may be separately fabricated and attached to the inner container housing bottom inner surface 16. To this end, the inner container housing 10 may be fabricated with a recess, groove, or the like to accommodate the thermoregulation members 26, 28.

To further optimize performance of any thermoelectric module or heat/cold transfer unit herein, a layer of thermally conductive grease (i.e. AOS 52022 or Dow Corning G340) may be spread in the location where the module will be seated on the heat sink and/or where the module will be adjacent to the inner container housing 10. In addition, if the invention will be operating at temperatures near the dew point, or if the invention will be routinely turned off, condensation from the components may form into water that can then enter the module. This moisture can cause corrosion leading to performance deterioration or an electrical short. Adequate care should be taken to seal modules from moisture. Accordingly, a protective layer may be used in conjunction with the thermoelectric module. For example, a bead of epoxy or room temperature vulcanizer (RTV) can be applied to the outside edges of the module and sufficiently far down the leads to prevent wicking. This form of protection is adequate in many situations. When module reliability and performance are critical, it is recommended to seal the internal components of the module with an anti-corrosion potting material.

As mentioned above, there may be at least one second thermoregulation member 28, which may comprise at least one of a heater coil, radiant heat module, convection heat module, heater band, flexible heater band, thermoelectric module, and conduction heat module, or combination thereof. In one embodiment, as shown in FIG. 1, the second member 28 may be at least one heater band, such as flexible silicone heater bands. As shown in FIG. 1, the second member 28 may be disposed adjacent to the side wall external surface 24. Any member 28 may be designed to be submersible and therefore, the second member 28 may be disposed adjacent to the side wall inner surface 22 (not shown). The location of the second member 28 may be determined by the effectiveness of heat transfer to the internal space 12. Accordingly, it is contemplated that one or more second members 28, such as heater bands or thermoelectrics, or any combination thereof may be used, either outside the inner container housing or inside it. In the event heater bands are used, these can be vulcanized to the inner container housing to provide maximum contact.

As also described above, a switch 30 may be operably connected to the first and second thermoregulation members 26, 28. The switch 30 can regulate the activity or activation of the first and second members 26, 28. The switch 30 may be designed in such a way as to turn off either or both members 26, 28 independently or jointly. That is, the switch 30 may permit both members 26, 28 to be on together, be off together, or to have one member on and the other off. FIG. 1 also shows that the switch may be connected to a timer 38. The timer may be a programmable timer and may be operably connected to an input device. The input device can be used to program the timer or to set various features of the switch and/or timer. In one embodiment, the input device may comprise at least one of a keypad, keyboard, sound activated module, pointer, touch screen, dial, or button, or combination thereof. Timers are readily available from electronic coffee machines or clock radios. The switch may include an override switch to override operation of the timer.

Accordingly, in operation using FIG. 1 as a non exclusive example, one method of operation would generally to heat or cool the container inserted into the housing using one or more of the thermoregulation members 26, 28. For example, if the container was to be cooled, the first member 26 may be used. If the container was to be heated, the second member 28 may be used. It is, of course, well understood that both members may be used, as appropriate for heating and/or cooling, simultaneously, sequentially, or overlappingly. In a more particular embodiment, a control unit such as the switch 30 and/or timer 38 and/or programming and/or thermostat and/or microprocessor, can modulate activity between the members 26, 28. Accordingly, in operation, the container can be inserted into the internal space 12 so that it sits atop of the heat sink 32. A fluid, such as a liquid, such as water, can be poured into the internal space 12 thereby partially, substantially, or entirely covering the container. To cool the container, the first thermoregulating member 26, such as the thermoelectric module may be activated. As the module is turned on, the cold side draws heat from the inner container housing and that in turns draws heat out of the water bath, which in turn draws heat out of the container, thereby cooling the container. The heat is ejected from the module and dissipated with assistance from the heat sink 34 and the fan 36. Multiple heat sinks or fans may be used. When the user desires or when the timer activates, the first member 26 may shut off and the second member 28 activate. In this manner, the second member 28, which may be heater bands, begin heating the inner container housing 10, which transmit the heat to the water bath in the internal space 12, and thereby heat the container. One or more heater bands may be used to increase the heating. In addition, heater bands may be used in conjunction with other heating modes, such as a heater coil, radiant heat module, convection heat module, thermoelectric module, and conduction heat module. The first member 26 may also be configured to heat the unit. This could be done by reversing the current flow in the first member 26 so that the plate adjacent to the inner container housing bottom becomes hotter.

In another embodiment, thermoelectric modules may be stacked to increase heating or cooling of the units. For example, the more cooler the hot side becomes, the more heat can be absorbed by the cold side. In effect, by keeping the hot side cooler, the module can absorb more heat from the internal space and thereby more effectively cool the internal space. So because a thermoelectric module has a cold side and a hot side, a second thermoelectric can be positioned or stacked beside a first one whereby the cold side of the second module is adjacent to the hot side of the first module. In operation, this means that the as the cold side of the first module absorbs heat from the internal space, it will eject that heat to the first module hot side. The second module cold side will absorb that ejected heat and eject it to the second module hot side. In this regard, the first module hot side stays cool and thus the internal space can get cooler.

In another embodiment, the invention may also include a programmable timer, whose operation can be best illustrated by way of example. If it is known that a baby is scheduled for a feeding at 2:00, the timer can be set for 1:55 so that at that time, the invention will switch from cooling mode (which could be the default mode) into heating mode. In the event the container is needed earlier, an override switch may be activated to turn off the cooling mode and switch to heating mode. The programming may include modes for multiple compartments, multiple bottles, different types of bottles, different fluid volumes, different bottle volumes, teaching modes, maximum temperatures, minimum temperatures, time duration of cycles, number of cycles, etc.

Moreover, in yet another embodiment of the invention, there is taught a method that can provide convenient warming or cooling of a container, such as a soda can, cup, or baby bottle, inserted into an inner container housing, comprising (a) providing an engaging signal to activate a thermoregulator control unit; and (b) engaging a thermoregulator in response to the control unit activation such that the thermoregulator will heat or cool the inner container housing. This method may also include in the step of providing a signal by including the step of providing a timing signal generated from a programmable timer.

In yet another embodiment of the invention, another method taught includes a method to heat or cool a container, comprising: (a) activating a control unit to activate a thermoregulator; (b) heating or cooling the container in response to the thermoregulator activation; (c) wherein the cooling is by at least one of a recirculating water bath, evaporator, heat transfer fluid unit, plurality of fins, at least one fan, thermoelectric module, Stirling Cycle unit, absorption unit, refrigerant unit, thermoacoustic unit, heat sink, or combination thereof; and the heating is by at least one of a heater coil, radiant heat module, convection heat module, thermoelectric module, and conduction heat module, or combination thereof.

Any method herein may also include the step of programming a timer to activate the control unit, heating the container in response to a control unit activation signal, and cooling the container in response to a control unit activation signal.

And yet another method includes a method to heat or cool a container, comprising: (a) activating a cooling unit to cool an inner container housing; (b) programming a timer to generate a control signal when the timer goes off; and (c) activating a heating unit in response to the control signal to heat the inner container housing and shutting off the cooling unit.

In yet another embodiment related to baby bottle cooling or warming, the invention includes a method of using an apparatus to warm a baby bottle, comprising: (a) inserting a baby bottle into the apparatus; (b) engaging a cooling unit in the apparatus to cool the baby bottle; and (c) engaging a warming unit in the apparatus to heat the baby bottle. The method of using the apparatus to warm or cool the baby bottle may also include setting a switch to modulate activity between the cooling and heating units.

In any of these methods, the cooling units and heating units may be placed anywhere along the inner container housing 10. In some embodiments, the heating units may be one or more heater bands that run circumferentially around the inner container housing (either inside or outside it), or may be thermoelectric modules disposed around the inner container housing 10. Any heating unit may also be placed adjacent the inner container housing bottom 14. Similarly, the cooling units may be one or more thermoelectric modules, fans, evaporators, radiators, heat sinks, water baths, refrigerants, refrigeration units, thermoacoustic units, etc., that may be positioned anywhere along the inner container housing 10 (either inside or outside it), adjacent the inner container housing bottom 14, or the like.

In yet another embodiment of the invention, the invention may include an apparatus that can provide convenient warming or cooling of a container inserted into a thermoregulation unit, comprising: (a) a means for adjusting the temperature of the container; and (b) a means for controlling the means for adjusting the temperature of the container. The means for adjusting the temperature may comprise at least one of a recirculating water bath, evaporator, heat transfer fluid unit, plurality of fins, at least one fan, thermoelectric module, Stirling Cycle unit, absorption unit, refrigerant unit, thermoacoustic unit, heat sink, heater coil, radiant heat module, convection heat module, thermoelectric module, and conduction heat module, or combination thereof.

In other embodiments, the means for adjusting the temperature may further include a means for cooling the container and a means for heating the container. The means for cooling the container may further include at least one of a recirculating water bath, evaporator, heat transfer fluid unit, plurality of fins, at least one fan, thermoelectric module, Stirling Cycle unit, absorption unit, refrigerant unit, thermoacoustic unit, heat sink, or any combination thereof; and the means for heating the container further includes at least one of a heater coil, radiant heat module, convection heat module, thermoelectric module, and conduction heat module, or any combination thereof. For example, the means for cooling may comprise a thermoelectric module and the means for heating may comprise a heater band.

As with any means described herein, a means may comprise a combination of features and it is intended that the means are construed either in gross on a large scale basis or more narrowly on a component by component basis.

Figure 3:
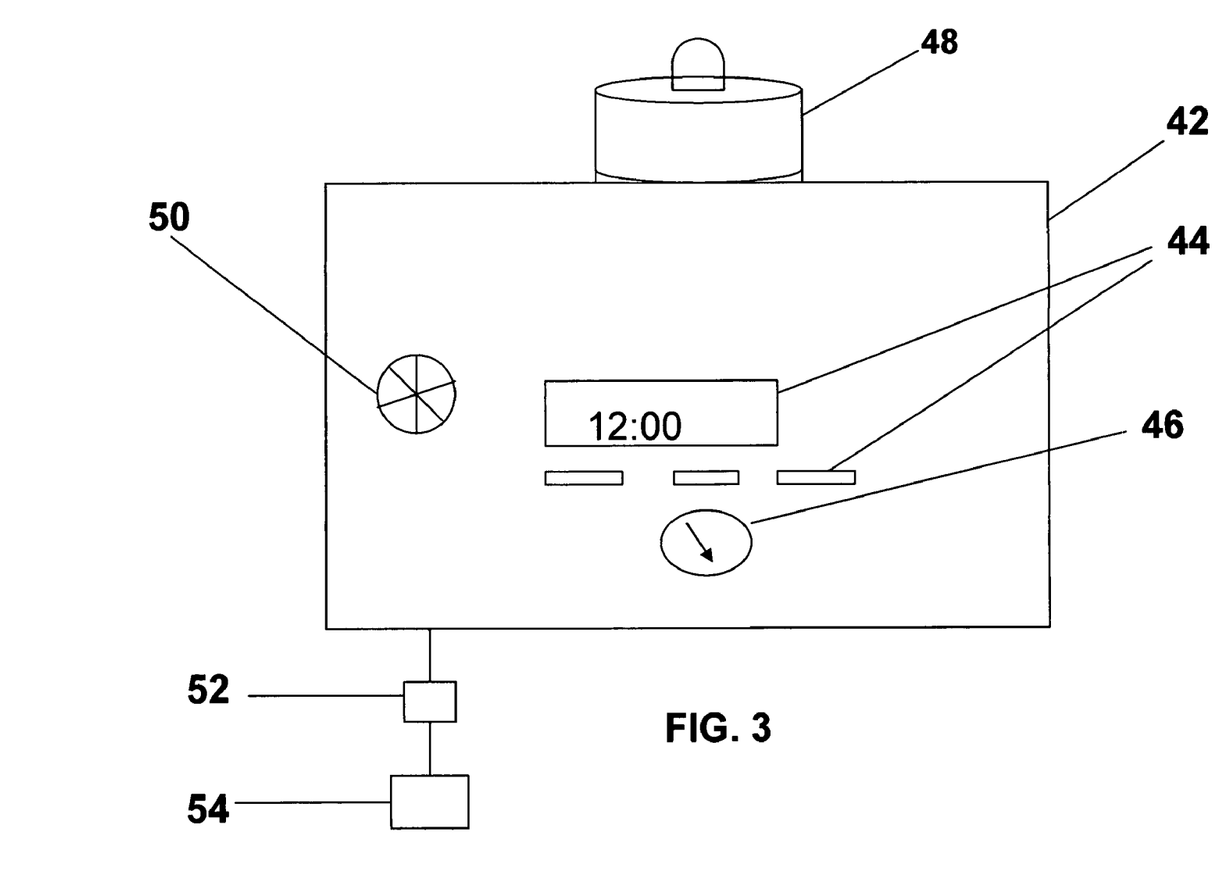
FIG. 3 is another embodiment of the invention.

In any embodiment herein, the means for controlling may further include an input device 44, such as at least one of a timer, keypad, keyboard, sound activated module, pointer, touch screen, dial, and button, or any combination thereof. In any embodiment, the apparatus may include at least one of a sound activation override switch, breakaway cord, display, weight sensor, thermostat, drain port, basket, lid, battery backup, car adapter, audible alarm, external light, and agitator, or any combination thereof, as seen in FIG. 3, parts 52, 54.

For example, a shaker or agitator may be used to shake the bottle during warming to reduce chances of heat bubbles. The agitator can be switched on/off separately or may also be separately programmable. Other features of the unit may include a tie down or lid on the unit to keep the bottle from floating up (keeps the bottle partially or substantially immersed). The unit including the lid can be insulated too; or the lid—or any other part of the unit—can be neon and/or glow in the dark. The unit may also include compartments adapted to receive various bottles (e.g., Avent bottles tend to be wider; or bottles may be angled). There may also be multiple compartments (for many bottles) with multiple circuitry. In this regard, one timer can turn on at a first time and the subsequent timers at subsequent times.

Other features include adapters for a car lighter use or battery compartment for portability. Any compartment may be adapted for use with baby food bottles. Suction pads may be added to the bottom to increase safety. The apparatus may also a temperature sensor to monitor how fast the unit cools down or how fast the heater heats to avoid flash heating/cooling and potential glass breakage or plastic cracks. The unit may also include a carrying handle.

In addition, a nightlight to illuminate surrounding area may be provided. For example, a low wattage bulb can be used to illuminate the area and this avoids turning on room lights. The nightlight can be along one wall of the unit or may ring around the unit. The light can be always on if it is plugged in, or may have a manual on/off, or turn on once the alarm sounds or timer engages, or turns on once bottle is lifted off bottom plate (i.e., a weight sensor trips the nightlight on).

For increased safety, the unit may be provided with a breakaway cord so that an entanglement will not pull the unit down, but will break the power cord. Various iterations of breakaway cords are in U.S. Pat. Nos. 5,941,719; 5,480,313; 5,462,452; 5,399,102; 4,874,316; 4,045,105; 3,808,577; 3,611,271; 3,363,214; 2,696,594; 2,490,580; 2,456,548; 2,394,618; and 2,170,287; the disclosures of which are expressly incorporated by reference. In general, these breakaway cords have interruptions in the cord in a male-female plug configuration such that the break will occur at the male-female junction. Other configurations include magnetic plate junctions.

In another embodiment of the invention, the unit may also comprise a sound receiver adapted to turn on when the baby cries. It is well-accepted that the baby's cry is often loud and of a certain high pitch. To this end, the unit may include a sound transmitter and receiver. The transmitter may be removable such that it may be placed in proximity to the baby. Once the baby begins cry, the transmitter receives the baby cry and transmits it to the unit receiver, which then activates the heater unit. Thus, the unit may be in one room and the transmitter in the baby's room. The unit may also be programmed by including a recording memory unit to record a baby's cry. Once the transmitter receives the crying noise and sends it to the unit receiver, the unit then compares the incoming signal with the preprogrammed cry to determine if the unit should engage the heating unit. The transmitter-receiver units may be readily adapted from the conventional baby room monitors.

Furthermore, the unit may also include a memory bank so that temperature information may be programmed. In this regard, the maximum temperatures may be set such that the maximum temperature is below the melting point of the bottle or below the melting point of disposable liners. Once programmed, the unit need not be reconfigured each time. In this regard, the unit would not normally burn the plastic bottle or liner. Accordingly, the unit may be programmed to "understand" what temperatures to use with what bottles, what temperatures to use with what volume, or a combination of both. For example, buttons on the unit may be programmed with various bottle information indicia so that the user need only press a button corresponding to the bottle selected for use. The user may also press a button to select the volume of liquid in the bottle. Moreover, the unit may be programmed to respond to various bottle contents (e.g., foods or liquids) as different contents will heat or cool differently.

As an another embodiment of the invention, the invention may also comprise a teaching mode to educate the unit on the type of bottle, temperatures, and cycle times. This would in turn keep the heaters on for a preprogrammed amount of time assuring the bottle does not get too hot. Instead of the preprogrammed approach, the user could teach the warmer/cooler the correct time for the heat cycle. To teach the warmer/cooler, the user would put it into teach mode. The user would then put a thermometer or other temperature sensor into the bottle and turn on the heater. When the contents of the bottle reach the correct temperature, the user would press a set button. The warmer/cooler would then know the correct cycle time and correct temperature. The thermometer could be plugged into the unit, thereby avoiding the need for the user to press a button when the bottle had reached temperature. As with any programming herein, the user can preprogram multiple bottles, so the user could select one depending on the volume of fluid in the bottle, or the type of bottle.

There are several benefits for allowing the user to teach the unit about various bottles and volumes of liquid. First, the user would not have to worry about testing with every type of bottle available. Second, the cycle times could be set for different volumes of liquid in the bottle. Yet another advantage would be for users in high altitudes. Because liquids boil at a lower temperature in higher altitude, it will take longer to heat the bottle in high altitude uses than at sea level. By teaching the warmer, the user is customizing it to his/her particular elevation.

As with any feature listed herein, while embodiments of the invention may include all the features listed herein, it is specifically contemplated that not all embodiments will possess all the features listed herein. Moreover, the inventors contemplate that many embodiments may specifically exclude any feature, including the exclusion of any feature listed specifically within a list of features. Furthermore, it is specifically contemplated that the apparatus or method claimed herein may comprising any feature, combination of features, or method(s) disclosed herein. In addition, it is also contemplated that one or more features may be combined.

Figure 2:
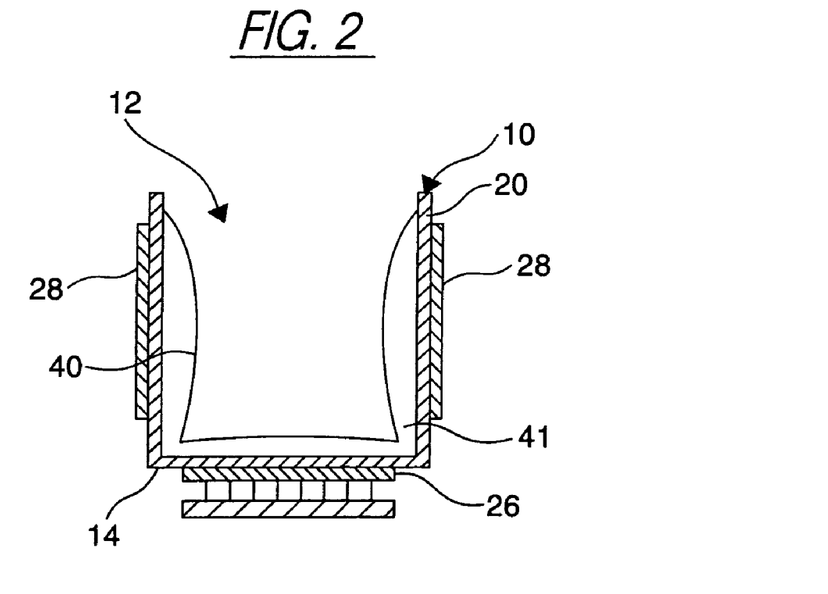
FIG. 2 is another embodiment of the invention.

FIG. 2 demonstrates another embodiment of the invention. Shown is the inner container housing 10 having a first thermoregulation member 26 and a second thermoregulation member 28. In this particular embodiment, the first member 26 may be a first thermoelectric module and the second member may be at least one thermoelectric module. In this embodiment, the first thermoelectric module is disposed by the inner container housing bottom 14. The at least one second thermoelectric module is located on the side wall 20. The embodiment also includes a sleeve 40 disposed in the inner container housing and more particularly in the inner space 12. Between the sleeve 40 and the inner container housing 10 is a heat transfer fluid 41. The heat transfer fluid may be gas or liquid, such as ethylene glycol. The choice of fluid is based on its heat transfer ability. In this embodiment, the fluid can be heated or cooled by the first and second members 26, 28 operating together or independently. That is, for cooling mode, the members 26, 28 may jointly cool. In heating modes, the member 26, 28 may jointly heat the fluid. In some embodiments, one member may be for heating and the other member for cooling. For example, as shown member 26 may be for cooling as it operably connected to the fans and heat sinks, whereas member(s) 28 are for heating.

Although generally described as a stand-alone unit, the invention may also be used in other environments. For example, the invention may be adapted for more large scale uses, such as nurseries, hospitals, group homes, or other places where the many containers need to be heated and cooled. The invention may also be used in automobiles, trucks, minivans, recreational vehicles, airplanes, boats, rockets, or other such vehicle. For example, in a car or truck, the invention may be placed in a console, such as the center console, or beside a seat, or the like. In this regard, the user may simply select any switch to either switch on the heaters, coolers, or the like to provide heat or cold to the container. Switches may be mounted on dashboards, consoles, or seats.

FIG. 3 shows another embodiment of the invention in which an outer housing 42 is shown. The outer housing 42 partially or totally surrounds the inner container housing. Outer housing 42 may be used to hide the inner components and provide an aesthetically pleasing housing. Also shown in FIG. 3 is an input device 44 as described herein. An override switch 46, such as a dial switch may be provided. Shown is a container 48, such as a baby bottle, in the inner container housing internal space 12. In some embodiments, an alarm 50 may be present.

Accordingly, another embodiment of the invention may include, a baby bottle warmer and cooler, comprising: (a) an outer housing 42 adapted to receive the baby bottle 48; (b) the outer housing 42 containing an inner housing 10 adapted to receive the baby bottle 48, (c) the inner housing 10 having an internal space 12, an inner housing bottom 14, the inner housing bottom 14 further including an inner housing bottom inner surface 16 and an inner housing bottom external surface 18, and the inner housing further comprising at least one side wall 20, the side wall having a side wall inner surface 22 and a side wall external surface 24; (d) at least one first thermoregulation member 26 adjacent to the inner housing 10 comprising at least one of a water bath, recirculating water bath, evaporator, heat transfer fluid unit, plurality of fins, at least one fan, thermoelectric module, Stirling Cycle unit, absorption unit, refrigerant unit, thermoacoustic unit, and heat sink, or combination thereof; (e) at least one second thermoregulation member 28 adjacent to the inner housing comprising at least one of a heater coil, radiant heat module, convection heat module, heater band, flexible heater band, thermoelectric module, and conduction heat module, or combination thereof; (f) a switch 30 operably connected to the first and second thermoregulation members, the switch being operably connected to a timer 38; and (g) an input device 44 on the outer housing 42 operably connected to the switch.

It should be understood that the foregoing relates only to a limited number of embodiments that have been provided for illustration purposes only. It is intended that the scope of invention is defined by the appended claims and that modifications to the embodiments above may be made that do not depart from the scope of the claims.

We claim:

1. An apparatus that can provide convenient warming and cooling of a container, comprising:
   (a) an inner container housing having an internal space, an inner container housing bottom, the inner container housing bottom further including an inner container housing bottom inner surface and an inner container housing bottom external surface, the inner container housing adapted to at least partially enclose the container, and the inner container housing further comprising at least one side wall having a side wall inner surface and a side wall external surface;
   (b) at least one first thermoregulation member adjacent to the inner container housing comprising at least one of a water bath, recirculating water bath, evaporator, heat transfer fluid unit, plurality of fins, at least one fan, thermoelectric module, Stirling Cycle unit, absorption unit, refrigerant unit, thermoacoustic unit, and heat sink, or combination thereof;
   (c) at least one second thermoregulation member adjacent to the inner container housing comprising at least one of a heater coil, radiant heat module, convection heat module, heater band, flexible heater band, thermoelectric module, and conduction heat module, or combination thereof; and (d) a switch operably connected to the first and second thermoregulation members.

2. The apparatus of claim 1, wherein the inner container housing bottom further includes a heat sink.

3. The apparatus of claim 2, wherein the heat sink is integrally formed with the inner container housing bottom.

4. The apparatus of claim 2, wherein the heat sink is integrally formed with the inner container housing.

5. The apparatus of claim 3, wherein the at least one side wall is integrally formed with the inner container housing bottom.

6. The apparatus of claim 1, wherein the first thermoregulation member is a thermoelectric module.

7. The apparatus of claim 6, wherein a heat sink and a fan are operably connected to the thermoelectric module.

8. The apparatus of claim 7, wherein thermal grease is disposed between the thermoelectric module and the inner container housing.

9. The apparatus of claim 6, wherein the thermoelectric module is partially or totally covered by a protective barrier.

10. The apparatus of claim 7, wherein a cold side of the thermoelectric module is adjacent to the inner containing housing bottom.

11. The apparatus of claim 1, wherein the at least one second thermoregulation member is adapted to apply heat to the inner container housing.

12. The apparatus of claim 11, wherein the second thermoregulation member is adjacent to the at least one side wall.

13. The apparatus of the claim 12, wherein the second thermoregulation member is a heater band adjacent to the side wall external surface.

14. The apparatus of claim 12, wherein the second thermoregulation member is adjacent to the side wall inner surface.

15. The apparatus of claim 14, wherein the second thermoregulation member is submersible.

16. The apparatus of claim 1, wherein the switch is connected to a timer.

17. The apparatus of claim 16, wherein the timer is a programmable timer.

18. The apparatus of claim 17, wherein the apparatus further includes an input device comprising at least one of a keypad, keyboard, sound activated module, pointer, touch screen, dial, or button, or combination thereof.

19. The apparatus of claim 1, wherein the first thermoregulation member is a thermoelectric module, the second thermoregulation member is a heater band, and the switch is operably connected to a programmable timer.

20. The apparatus of claim 19, wherein the inner container housing includes a heat sink on the inner container housing bottom inner surface, the thermoelectric module is adjacent to the inner container housing bottom external surface, and the heater band is adjacent to the side wall external surface.

21. The apparatus of claim 19, wherein the switch also includes an override switch to override the programmable timer.

22. The apparatus of claim 19, wherein the apparatus further includes at least one of a sound activation override switch, breakaway cord, display, weight sensor, thermostat, drain port, basket, lid, battery backup, audible alarm, external light, and agitator, or combination thereof.

23. The apparatus of claim 19, wherein the inner container housing includes at least one sleeve disposed between the inner containing housing internal space and either the inner container housing bottom or the side wall or both.

24. An apparatus that can provide convenient warming or cooling of a container inserted into at least one first and second thermoregulation unit, comprising:

(a) a means for adjusting the temperature of the at least one first and second thermoregulation unit;

(b) a means for controlling the means for adjusting the temperature of the at least one first and second thermoregulation unit, wherein at least one of the thermoregulation unit comprises a substantially continuous, non-pliable, side wall inner surface;

(c) wherein the at least one first thermoregulation member is adjacent to an inner housing comprising at least one of a water bath, recirculating water bath, evaporator, heat transfer fluid unit, plurality of fins, at least one fan, thermoelectric module, Stirling Cycle unit, absorption unit, refrigerant unit, thermoacoustic unit, and heat sink, or combination thereof; and (d) wherein the at least one second thermoregulation member is adjacent to the inner housing comprising at least one of a heater coil, radiant heat module, convection heat module, heater band, flexible heater band, thermoelectric module, and conduction heat module, or combination thereof.

25. The apparatus of claim 24, wherein the means for adjusting the temperature comprises at least one of a recirculating water bath, evaporator, heat transfer fluid unit, plurality of fins, at least one fan, thermoelectric module, Stirling Cycle unit, absorption unit, refrigerant unit, thermoacoustic unit, heat sink, heater coil, radiant heat module, convection heat module, thermoelectric module, and conduction heat module, or combination thereof.

26. The apparatus of claim 24, wherein the means for adjusting the temperature further includes a means for cooling the thermoregulation unit and a means for heating the thermoregulation unit.

27. The apparatus of claim 26, wherein the means for cooling the container further includes at least one of a recirculating water bath, evaporator, heat transfer fluid unit, plurality of fins, at least one fan, thermoelectric module, Stirling Cycle unit, absorption unit, refrigerant unit, thermoacoustic unit, heat sink, or combination thereof; and the means for heating the container further includes at least one of a heater coil, radiant heat module, convection heat module, thermoelectric module, and conduction heat module, or combination thereof.

28. The apparatus of claim 27, wherein the means for controlling further includes an input device, the input device comprising at least one of a timer, keypad, keyboard, sound activated module, pointer, touch screen, dial, and button, or combination thereof.

29. The apparatus of claim 28, wherein the apparatus further includes at least one of a sound activation override switch, breakaway cord, display, weight sensor, thermostat, drain port, basket, lid, battery backup, audible alarm, external light, car adapter, and agitator, or combination thereof.

30. The apparatus of claim 28, wherein the means for cooling comprises a thermoelectric module and the means for heating comprises a heater band.

31. A method that can provide convenient warming or cooling of a container inserted into an inner container housing, comprising:

(a) providing an engaging signal to activate a thermoregulator control unit; and (b) engaging at least one first thermoregulator or second thermoregulator in response to the thermoregulator control unit activation such that the at least one first or second thermoregulator and will heat or cool an inner container housing inner space, the inner container housing including a substantially continuous, non-pliable side wall inner surface and wherein the at least one first thermoregulation member comprises at least one of a water bath, recirculating water bath, evaporator, heat transfer fluid unit, plurality of fins, at least one fan, thermoelectric module, Stirling Cycle unit, absorption unit, refrigerant unit, thermoacoustic unit, and heat sink, or combination thereof; and wherein the at least one second thermoregulation member comprises at least one of a heater coil, radiant heat module, convection heat module, heater band, flexible heater band, thermoelectric module, and conduction heat module, or combination thereof.

32. The method of claim 31, wherein the step of providing a signal includes the step of providing a timing signal generated from a programmable timer.

33. A method to heat or cool a container, comprising:
(a) activating a cooling unit to cool an adjacent inner container housing inner space, the inner container housing including a substantially continuous side wall inner surface;
(b) programming a timer to generate a control signal when the timer goes off; and
(c) activating a heating unit to heat the inner container housing inner space in response to the control signal and shutting off the cooling unit.

34. The method of claim 33, wherein the cooling unit is a thermoelectric module and the heating unit is a heater band.

35. A method of using an apparatus to warm a baby bottle, comprising: (a) inserting a baby bottle into the apparatus, wherein the apparatus comprises a substantially continuous, non-pliable, side wall inner surface; (b) engaging a cooling unit in the apparatus adjacent to an inner container housing to cool the baby bottle, the cooling unit comprising at least one of a water bath, recirculating water bath, evaporator, heat transfer fluid unit, plurality of fins, at least one fan, thermoelectric module, Stirling Cycle unit, absorption unit, refrigerant unit, thermoacoustic unit, and heat sink, or combination thereof;

and (c) engaging a warming unit in the apparatus to heat the baby bottle, the warming unit comprising at least one of a heater coil, radiant heat module, convection heat module, heater band, flexible heater band, thermoelectric module, and conduction heat module, or combination thereof.

36. The method of claim 35, including setting a switch to modulate activity between the cooling and heating units.

37. A baby bottle warmer and cooler, comprising:
(a) an outer housing adapted to receive the baby bottle;
(b) the outer housing containing an inner housing adapted to receive the baby bottle;
(c) the inner housing having an internal space, an inner housing bottom, the inner housing bottom further including an inner housing bottom inner surface and an inner housing bottom external surface, and the inner housing further comprising at least one side wall, the side wall having a side wall inner surface and a side wall external surface;
(d) at least one first thermoregulation member adjacent to the inner housing comprising at least one of a water bath, recirculating water bath, evaporator, heat transfer fluid unit, plurality of fins, at least one fan, thermoelectric module, Stirling Cycle unit, absorption unit, refrigerant unit, thermoacoustic unit, and heat sink, or combination thereof;
(e) at least one second thermoregulation member adjacent to the inner housing comprising at least one of a heater coil, radiant heat module, convection heat module, heater band, flexible heater band, thermoelectric module, and conduction heat module, or combination thereof;
(f) a switch operably connected to the first and second thermoregulation members, the switch being operably connected to a timer; and
(g) an input device on the outer housing operably connected to the switch.

38. The apparatus of claim 37, wherein the apparatus further includes at least one of a sound activation override switch, breakaway cord, display, weight sensor, thermostat, drain port, basket, lid, battery backup, audible alarm, external light, car adapter, and agitator, or combination thereof.

* * * * *